United States Patent
Huh et al.

(10) Patent No.: US 7,895,438 B2
(45) Date of Patent: Feb. 22, 2011

(54) METHOD AND APPARATUS FOR GENERATING AND VERIFYING DIGITAL SIGNATURE

(75) Inventors: Mi-suk Huh, Suwon-si (KR); Kyung-hee Lee, Yongin-si (KR); Sergey Bezzateev, St. Petersburg (RU); Evgeny Krouk, St. Petersburg (RU); Tae-chul Jung, Seongnam-si (KR); Alexandra Afanasyeva, St. Petersburg (RU); Alexey Sitalov, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1388 days.

(21) Appl. No.: 11/367,446

(22) Filed: Mar. 6, 2006

(65) Prior Publication Data
US 2008/0022105 A1    Jan. 24, 2008

(30) Foreign Application Priority Data
Mar. 4, 2005    (KR) ...................... 10-2005-0018119

(51) Int. Cl.
*H04L 9/00* (2006.01)
*H04L 9/32* (2006.01)
(52) U.S. Cl. ...................................... 713/176; 380/285
(58) Field of Classification Search .................. 713/175, 713/176, 177; 380/285; 714/758, 763
See application file for complete search history.

(56) References Cited

U.S. PATENT DOCUMENTS

| | | | |
|---|---|---|---|
| 5,943,426 A * | 8/1999 | Frith et al. .................. | 713/153 |
| 6,578,144 B1 * | 6/2003 | Gennaro et al. ............. | 713/176 |
| 7,499,551 B1 * | 3/2009 | Mire .......................... | 380/279 |
| 2004/0128511 A1 * | 7/2004 | Sun et al. .................... | 713/176 |
| 2006/0036926 A1 * | 2/2006 | Hocevar ...................... | 714/758 |
| 2006/0262925 A1 * | 11/2006 | Matsumoto et al. .......... | 380/28 |
| 2007/0190977 A1 * | 8/2007 | Fok et al. .................... | 455/411 |

OTHER PUBLICATIONS

Author : Johan Van Tilburg Title: security-analysis of a class of cryptosystems based on linear error-correcting codes date: 1994 Publisher: Royal PTT Nederland NV, PTT research, Leidschendam ISBN: 90-72125-45-2.*

* cited by examiner

*Primary Examiner*—Minh Dieu Nguyen
(74) *Attorney, Agent, or Firm*—Sughrue Mion, PLLC

(57) ABSTRACT

Disclosed are a method and apparatus capable of reducing the number of computations required to generate a digital signature by a digital signature generator. A digital signature generator generates a code word for a received message by a function F for generating a code word having a set weight value and generates a digital signature based on the generated code word and an inverse of a public parity check matrix H, the parity check matrix H is one way function. A digital signature receiver converts the received message using the function F for generating a code word, and multiplies a public parity check matrix H by a received digital signal, the public parity check matrix H is a one way function, and comparing the converted value with the multiplication result.

14 Claims, 4 Drawing Sheets

METHOD AND APPARATUS FOR GENERATING AND VERIFYING DIGITAL SIGNATURE

CROSS-REFERENCE TO RELATED APPLICATIONS

This application claims priority under 35 U.S.C. §119 from Korean Patent Application No. 2005-0018119, filed on Mar. 4, 2005, the entire content of which is incorporated herein by reference.

BACKGROUND OF THE INVENTION

1. Field of the Invention

The present invention relates to a digital signature, and more particularly, to a method and an apparatus for generating and verifying a digital signature, which rapidly generates a digital signature by simplifying a signing procedure.

2. Description of the Related Art

A digital signature is information to identify a signer's identity through a computer to replace writing materials such as pen and pencils. Such a digital signature is appended to a message or is logically combined with electronic data. The digital signature is used for the purpose of identifying a signer's identity and certifying authentication of a person with a corresponding message. The digital signature is an electronic substitute for a manual signature or seal, and may be information generated through a computer instead of a pen. In general, the digital signature uses a public key (asymmetrical) ciphering system.

The digital signature certifies a fact that a person indicated as a writer in the digital signature writes a corresponding electronic document, and a fact that written contents were not forged or altered during transmission and reception. Further, the digital signature prevents a signer from denying the writing or signing of an electronic document.

The digital signature may effectively reduce the occurrence of a danger such as a loss of information when performing Internet shopping or cyber banking transactions. Accordingly, a use of the digital signature may deter peculation or forgery of private information.

The digital signature has been used for banking transactions such as Internet banking, Internet civil service, and Internet shopping, and has been expanding in scope to be used in International electronic commercial transactions and electronic voting. Certified authentication notes, necessary in Internet banking or on-line stock trading, is a representative digital signature issued by a national public authentication center and a public key thereof is managed thereby.

Several schemes exist, including the Rivest, Shamir, and Adelman (referred to as 'RSA' hereinafter) scheme and the McEliece scheme, for generating a digital signature using a public key. The RSA scheme is an algorithm developed in 1997 by three mathematicians Ron Rivest, Adi Shamir, and Leonard Adelman, and has been utilized in Internet encryption and authentication systems. The RSA scheme uses two large prime numbers (equal to or greater than 140). A public key and a private key are produced from a product of the two prime numbers and an additional calculation. The RSA scheme can encrypt and decrypt Internet information, and, more particularly, electronic mail. However, the RSA scheme has a drawback in that the functional operation of the scheme is complex.

FIG. 1 is a flow chart showing a conventional method for generating and transmitting a digital signal for a message to a receiver side using the McEliece scheme. Hereinafter, a conventional method for transmitting a generated digital signature by reference to FIG. 1. When explaining the conventional method, the part of generating the digital signal is referred to as 'digital signature generator', and the part of receiving the digital signal is referred to as 'digital signature receiver'.

In step S100, a digital signature generator generates a digital message m to be signed. In step S102, the digital signature generator calculates a hash function for the message m to be signed using a hash algorithm. A Secure Hash Algorithm (referred to as 'SHA' hereinafter) may be used in step S102, which is a kind of hash algorithms. The SHA is an algorithm specified in the Secure Hash Standard (SHS), which was developed by National Institute of Standards and Technology (NIST) in U.S.A. The SHA converts a message having a length of 264 bits or less into a reduced message having a length of 160 bits. Since the SHA is a kind of hash algorithm, it is a one-way algorithm. Since the SHA is not related to the present invention, a detailed description thereof is omitted. In step S102, the digital signature generator sets "m'" as SHA(m).

In step S104, the digital signature generator outputs "$H^{-1}$ m'". "H" is a parity check matrix, which is a type of public key. Additionally, besides the digital signature generator and the digital receiver, the third party may also acquire "H". However, due to characteristics of "H", only persons knowing a construction of "H", can acquire "$H^{-1}$", which is an inverse matrix of "H". Consequently, the digital signature generator knowing a construction of "H", can also acquire "$H^{-1}$".

In step S106, the digital signature generator judges whether or not the acquired "$H^{-1}$m'" is a code word having the desired weight value. The weight value means the number of "1" in a code word, which is composed of "0" and "1". Accordingly, when the desired weight value is "3", the digital signature generator judges whether or not the number of "1s" in the generated code word is three. When the generated "$H^{-1}$ m'" is a code word having the desired weight value, a routine goes to step S110. On the contrary, when the generated "$H^{-1}$ m'" is not the code word having the desired weight value, a routine goes to step S108.

In step S108, the digital signature generator transforms "m" in a set fashion. As an example, by adding "1" to a transmitted message, "m" can be transformed. That is, when "m" is "1001100", a transformed "m" is "1001101". In step S108, "$m^T$" can be set as "m". After the routine returns to step S102, the digital signature generator calculates a hash function for "m". Although it is shown in step S102 that the hash function for "m" is calculated, a hash function for a transformed message is calculated when the transmitted message is transformed.

In step S110, the digital signature generator generates a digital signature (a), which is "$H^{-1}$ m'". In step S112, the digital signature generator transfers "m" together with the generated "a" to a digital signature receiver.

As noted previously, when "$H^{-1}$ m'" generated in step S104 is a code word having a desired weight value, the computation amount of the digital signature generator is reduced. However, there is a rare probability that "$H^{-1}$ m'" generated by the digital signature generator is a code word having a desired weight value. Steps S102 to S108 should repeat until the digital signature generator acquires a code word having a desired weight value. However, repeating the steps S102 to S108 increases the number of computations. Accordingly, a method capable of reducing the number of computations required to generate the digital signature by the digital signature generator, is needed.

SUMMARY OF THE INVENTION

Accordingly, it is an aspect of the present invention to provide a method capable of reducing the number of computations required to generate a digital signature by a digital signature generator.

Another aspect of the present invention is to provide a method capable of reducing the time taken to generate a digital signature by reducing the number of computations required to generate the digital signature by a digital signature generator.

A further aspect of the present invention is to provide a method capable of reducing the load of a digital signature generator by reducing the number of computations required to generate the digital signature by the digital signature generator.

The above aspects of the present invention are substantially realized by providing a method for generating a digital signature, and the method includes the steps of calculating a function F for generating a code word having a set weight value; converting a received message to generate a code word having the set weight value by the function F; generating a digital signature based on the code word having the set weight value and an inverse of a public parity check matrix H wherein the parity check matrix H is one way function; and transmitting the message and the generated digital signature.

In accordance with another aspect of the present invention, there is provided a method for verifying forgeries in a digital signature, including the steps of: (i) receiving a message and the digital signature for the message; and (ii) verifying whether or not the forgeries are detected in the digital signature using a public function F for generating a code word having a set weight value, a public parity check matrix, the received message, and the receive digital signature.

In accordance with a further aspect of the present invention, there is provided a digital signature generator, including a mapping section for generating a code word for a received message by a function F for generating a code word having a set weight value; and a decoder for generating a digital signature based on the code word from the mapping section and an inverse of a public parity check matrix wherein the public parity check matrix is one way function.

In accordance with still another aspect of the present invention, there is provided a digital signature verifying apparatus, including a mapping section for converting a received message using a function F for outputting a code word having a set weight value; and a calculator for multiplying a public parity check matrix H by a received digital signal wherein the public parity check matrix is one way function; and a confirmation section for comparing an output of the mapping section with an output of the calculator.

In accordance with still another aspect of the present invention, there is provided a system for generating and verifying a digital signature, including a digital signature generator for generating a code word for a received message by a function F for generating a code word having a set weight value and for generating a digital signature based on the generated code word and an inverse of a public parity check matrix H wherein the parity check matrix H is one way function; and a digital signature receiver for converting the received message using the function F for generating a code word, for multiplying a public parity check matrix H by a received digital signal wherein the public parity check matrix is one way function, and comparing the converted value with the multiplication result.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF THE EXEMPLARY EMBODIMENTS

Hereinafter, a method capable of the computation amount executed to generate a digital signature by a digital signature generator according an aspect of the present invention will be described with reference to accompanying drawings.

Figure 1:
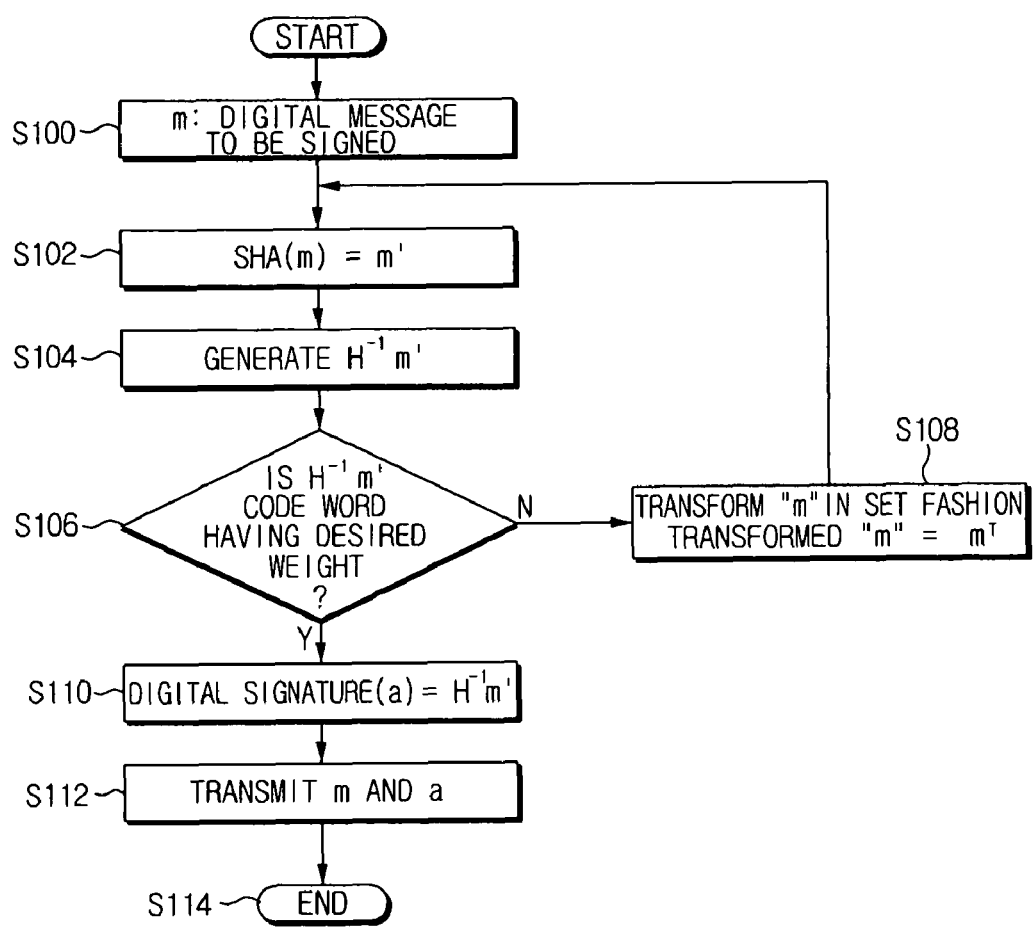
FIG. 1 is a flow chart that illustrates a conventional method for generating and transferring a digital signature.
Figure 2:
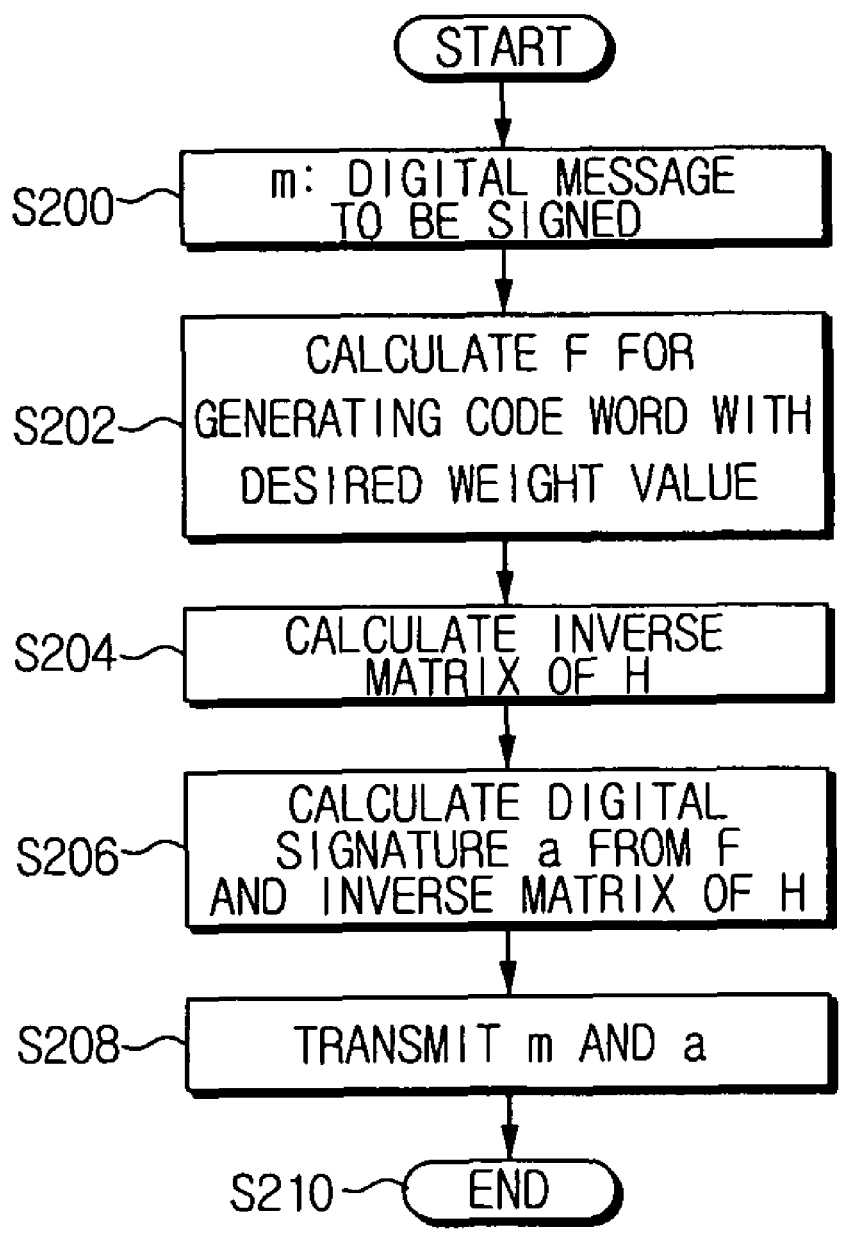
FIG. 2 is a flow chart that illustrates a method for generating and transferring a digital signature according to an exemplary embodiment of the present invention.

FIG. 2 is a flow chart that illustrates a method for generating and transferring a digital signature according to an exemplary embodiment of the present invention.

In step S200, a digital signature generator generates a digital message m to be signed.

In step S202, the digital signature generator calculates a function F to produce a codeword having a desired weight value. In step S204, the digital signature generator calculates an inverse matrix of "H". As described above, the "H" is a parity check matrix and a type of public key. That is, besides the digital signature generator and the digital signal receiver, a third party may acquire the "H". However, function "F" may be performed by using a "$G_{EQU}$" code. Namely, a function "F" to produce code words with the same weight value is a product of "H" and "$G_{EQU}$". "$G_{EQU}$" will now be explained.

$G_{EQU}$ code is composed of code words with the same weight value. One of various $G_{EQU}$ codes is expressed by a following equation 1.

$$G_{EQU} = (2^b - 1, b, 2^b/2) \qquad (1)$$

where, "$2^b - 1$" represents a length of a code, b represents the number of codes, $2^b/2$ represents a weight value. The $_{EQU}$ associated with the weight value will be described below. Table 1 illustrates a case where $G_{EQU} = (7, 3, 4)$ when b is three.

TABLE 1

| Code word |
|---|
| 1010101 |
| 0110011 |
| 0001111 |

Table 2 illustrates a case where $G_{EQU}=(15, 4, 8)$ when b is four.

TABLE 2

| Code word |
|---|
| 101010101010110 |
| 011001101100110 |
| 000111100001111 |
| 111100011110000 |

Table 1 describes three code words having a weight value of 4 and a code length of 7, and Table 2 describes four code words having a weight value of 8 and a code length of 15.

In step S206, the digital signature generator generates a digital signature "a". As shown in FIG. 2, the digital signature "a" is calculated by using the function "F" calculated in step S202 and the inverse matrix of "H" calculated in step S204. That is, the digital signature "a" becomes "FH$^{-1}$". Accordingly, the generated digital signature has a constant weight value due to characteristics of $G_{EQU}$ code. In other words, although a weight value of the message "m" varies, a digital signature with a constant weight value is generated. A weight value of the digital signature described above becomes $2^b/2$.

In step S208, the digital signature generator transfers the message "m" and the digital signature "a" to the digital signature receiver. The digital signature receiver judges whether or not a computed result "Ha" of the digital signature "a" and the parity check matrix "H" is identical with a computed result "F(m)" of the message "m" and the function "F". As a result of the judgment, when the computed result "Ha" is identical with the computed result "F(m)", the digital signature receiver recognizes that the message is received without forgery.

Further, the present invention provides a pattern used to confirm whether a forgery occurs in the digital signature receiver. That is, the digital signature receiver judges whether the forgery occurs according to whether "Ha" is identical with "Fm". The third party may be able to acquire $G_{EQU}$ code for forging a digital signature. Namely, the digital signature "a" may be obtained by a product of "m" and "$G_{EQU}$".

However, although "F" is disclosed to the third party, only persons knowing a construction of "H" can acquire "H$^{-1}$" due to characteristics of "H", which is an inverse matrix of "H". Consequently, only a digital signature generator knowing the characteristics of "H" can acquire "H$^{-1}$", whereas the third party cannot acquire "H$^{-1}$".

Figure 3:
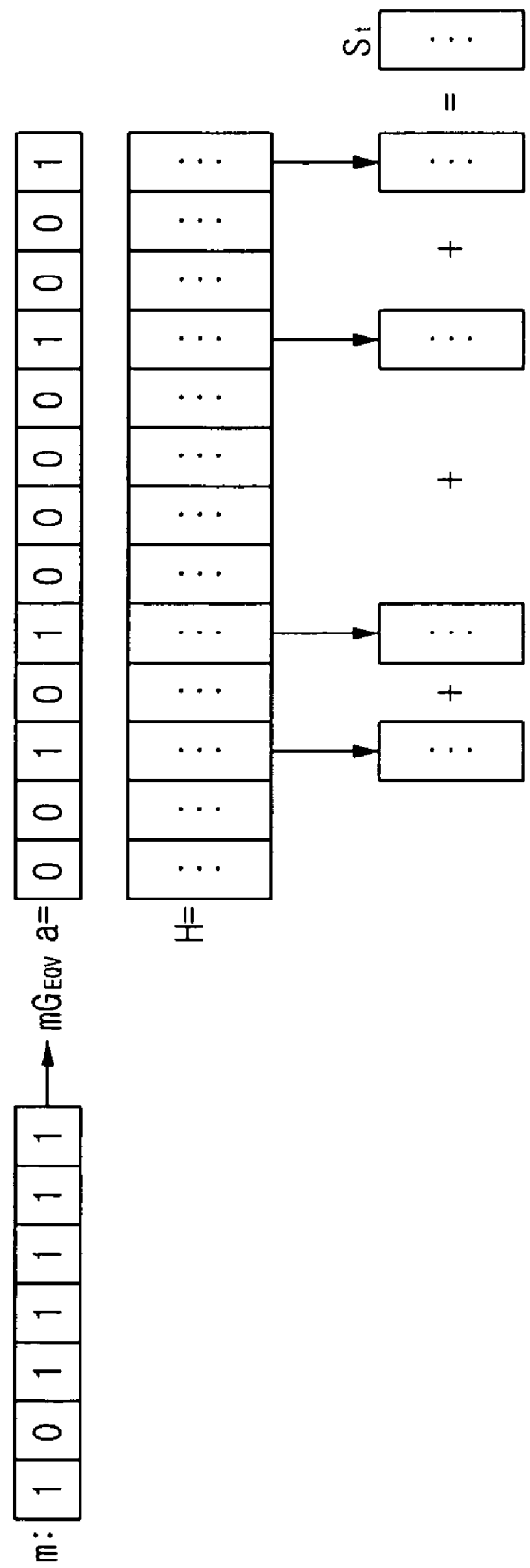
FIG. 3 is a view showing a generating procedure of a syndrome according to an exemplary embodiment of the present invention.

FIG. 3 is a view showing an example of a pattern according to an exemplary embodiment of the present invention.

Referring to FIG. 3, a message generated by the digital signature generator is "1011111", and a digital signature generated based on a set $G_{EQU}$" is "0010100001001".

Accordingly, the pattern according to the present invention becomes "Ha" this is the product of "a" and "H".

Figure 4:
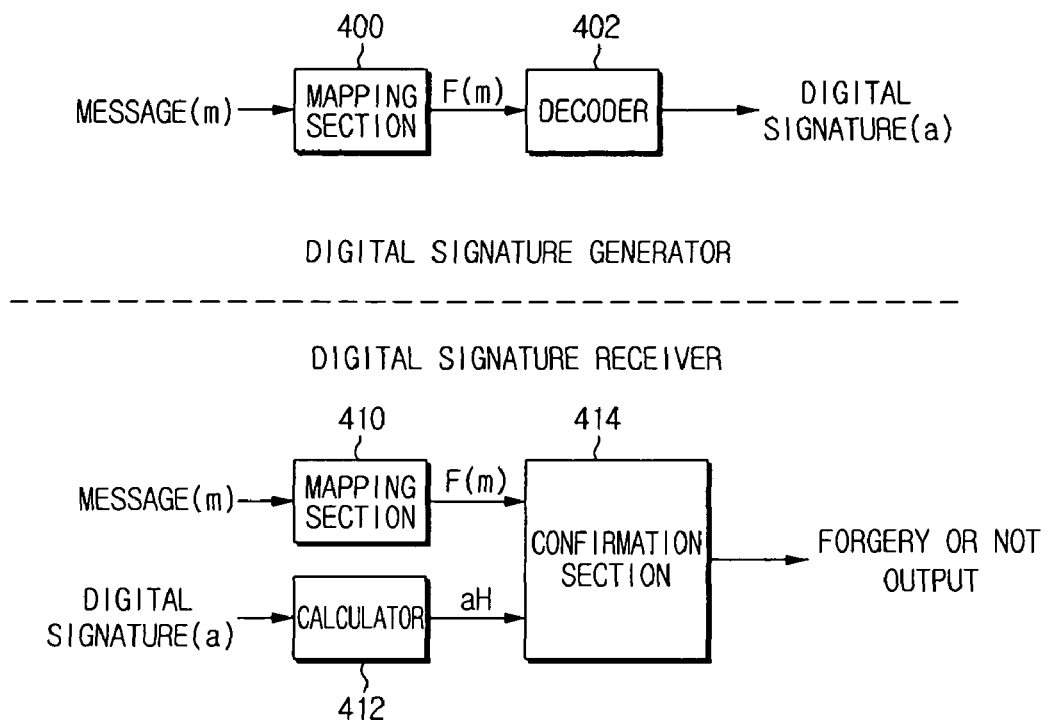
FIG. 4 is a block diagram showing a configuration of an apparatus for generating and verifying a digital signature with a digital signature generator for generating a digital signature and a digital signature receiver for verifying the generated digital signature.

FIG. 4 is a block diagram showing a configuration of an apparatus for generating and verifying a digital signature with a digital signature generator for generating a digital signature and a digital signature receiver for verifying the generated digital signature. Operations of the digital signature generator and the digital signature receiver will be explained below.

First, in the operation of the digital signature generator, a mapping section 400 receives a message in which a digital signature will be signed. The mapping section 400 calculates "F(m)" based on the received message using a function F for generating a code word having a desired weight value. The calculated "F(m)" is transferred to a decoder 402. The decoder 402 calculates a digital signature a based on the "F(m)" provided from the mapping section 400 and the "H$^{-1}$" obtained in advance. The digital signature generator transfers the calculated digital signature and the message to a digital signature receiver.

A mapping section 410 of the digital signature receiver calculates "F(m)" using the provided message and a previously set function F. The calculated "F(m)" is transferred to a confirmation section 414. A calculator 412 calculates "aH" using a received digital signature and a previously set matrix H. The calculated "aH" is transferred to the confirmation section 414. The confirmation section 414 judges whether or not "F(m)" and "aH" are identical with each other. As a result of the judgment, when "F(m)" and "aH" are identical with each other, the confirmation section 414 outputs a message indicating that the digital signature was not forged. When "F(m)" and "aH" are different from each other, the confirmation section 414 outputs a message indicating that the digital signature was forged.

The present invention reduces the number of computations required to generate the digital signature by the digital signature generator, whereby the time taken to generate the digital signature may be reduced. This may decrease the time taken to transmit and receive the message.

The foregoing embodiments and advantages are merely exemplary and are not to be construed as limiting the present invention. The present teaching can be readily applied to other types of apparatuses. Also, the description of the exemplary embodiments of the present invention are intended to be illustrative, and not to limit the scope of the claims, and many alternatives, modifications, and variations will be apparent to those skilled in the art.

What is claimed is:

1. A method for generating a digital signature, the method comprising:

calculating a function F for generating a code word having a set weight value;

generating the code word having the set weight value by converting a message using the function F;

generating the digital signature based on the code word having the set weight value and an inverse of a parity check matrix H wherein the parity check matrix H is a one way function; and transmitting the message and the generated digital signature, wherein the function F for generating the code word having the set weight value comprises a combination of a matrix G having a predetermined weight value and the parity check matrix H, wherein the generated digital signature of the message has the set weight value although a weight value of the message varies.

2. The method as claimed in claim 1, wherein the matrix G comprises a plurality of code words having the predetermined weight value.

3. The method as claimed in claim 2, further comprising converting a code word having a variable weight value into the code word having the set weight value by the matrix G.

4. The method as claimed in claim 2, wherein the inverse matrix of the parity check matrix H and the matrix G are not public.

5. A method for verifying forgeries in a digital signature, the method comprising:

receiving a message and the digital signature for the message; and verifying whether or not forgeries are detected in the digital signature using a public function F for generating a code word having a set weight value, a public parity check matrix, the received message, and the received digital signature, wherein the function F for generating the code word having the set weight value comprises a combination of a matrix G having a predetermined weight value and a parity check matrix H, wherein the received digital signature of the message has the set weight value although a weight value of the message varies.

6. The method as claimed in claim 5, wherein the matrix G comprises a plurality of code words having the predetermined weight value.

7. The method as claimed in claim 5, wherein verifying whether or not the forgeries are detected is determined according to whether or not a calculation result of the function F for the message is identical with a product of the parity check matrix H and the digital signature.

8. A digital signature generator, comprising:

a mapping section that generates a code word for a message by a function F for generating a code word having a set weight value; and a decoder that generates a digital signature based on the code word from the mapping section and an inverse of a parity check matrix H wherein the parity check matrix H is one way function, wherein the function F for generating the code word having the set weight value comprises a combination of a matrix G having a predetermined weight value and the parity check matrix H, wherein the received digital signature of the message has the set weight value although a weight value of the message varies.

9. The digital signature generator as claimed in claim 8, wherein the matrix G comprises a plurality of code words having the predetermined weight value.

10. A digital signature verifying apparatus, comprising:

a mapping section that converts a received message using a function F for outputting a code word having a set weight value; and a calculator that multiplies a public parity check matrix H by a received digital signal signature wherein the public parity check matrix H is a one way function; and a confirmation section for comparing an output of the mapping section with an output of the calculator, wherein the function F for generating the code word having the set weight value comprises a combination of a matrix G having a predetermined weight value and the parity check matrix H, wherein the received digital signature of the message has the set weight value although a weight value of the message varies.

11. The digital signature validation apparatus as claimed in claim 10, wherein the confirmation section outputs information indicating that the digital signature was not forged when the output of the mapping section is identical with the output of the calculator.

12. A system for generating and verifying a digital signature, comprising:

a digital signature generator that generates a code word for a message by a function F to generate the code word having a set weight value and to generate a digital signature based on the generated code word and an inverse of a parity check matrix H wherein the parity check matrix H is a one way function; and a digital signature receiver that converts the received message using the function F for generating the code word, that multiplies a parity check matrix H by a received digital signal wherein the public parity check matrix H is a one way function, and that compares the converted value with the multiplication result, wherein the function F for generating the code word having the set weight value comprises a combination of a matrix G having a predetermined weight value and the parity check matrix H, wherein the received digital signature of the message has the set weight value although a weight value of the message varies.

13. The system as claimed in claim 12, wherein the digital signature generator includes:

a mapping section that generates the code word for the message by a function F for generating the code word having the set weight value; and a decoder that generates the digital signature based on the code word from the mapping section and an inverse of the public parity check matrix H wherein the public parity check matrix H is one way function.

14. The system as claimed in claim 12, wherein the digital signature receiver comprises:

a mapping section that converts the message using the function F for outputting the code word having the set weight value; and a calculator that multiplies the public parity check matrix H by the received digital signal wherein the public parity check matrix H is one way function; and a confirmation section that compares an output of the mapping section with an output of the calculator.

* * * * *